(12) United States Patent
Thiery et al.

(10) Patent No.: US 6,934,168 B2
(45) Date of Patent: Aug. 23, 2005

(54) SINGLE STAGE PFC AND POWER CONVERTER UNIT

(75) Inventors: Vincent Thiery, La Rogue d'Antheron (FR); Bruno Charles Nadd, Lourmarin (FR); Thomas J. Ribarich, Laguna Beach, CA (US); John Ribarich, Laguna Beach, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/789,350

(22) Filed: Feb. 26, 2004

(65) Prior Publication Data

US 2004/0217746 A1 Nov. 4, 2004

Related U.S. Application Data

(60) Provisional application No. 60/450,572, filed on Feb. 27, 2003.

(51) Int. Cl.[7] .................. H02M 3/335; H05B 41/16
(52) U.S. Cl. .............. 363/21.02; 363/37; 315/247; 315/246; 315/209 R
(58) Field of Search .............. 363/21.02, 37, 363/16, 17, 74, 95, 97, 98; 315/247, 246, 209 R, 209 CD

(56) References Cited

U.S. PATENT DOCUMENTS 6,624,599 B1 * 9/2003 Chen et al. ............. 315/291

* cited by examiner

Primary Examiner—Tuyet Thi Vo
(74) Attorney, Agent, or Firm—Ostrolenk, Faber, Gerb & Soffen, LLP

(57) ABSTRACT

A power converter provides constant load power while achieving a high power factor in a single stage configuration with reduced component count and ratings. The power converter takes a rectified line input to a switching half-bridge that supplies current to a load. A series combination of shunt switch and capacitor is connected across the load to store energy from the input and supply energy to the load. The switches are operated with conduction angles that achieve constant power supplied to the load while drawing a sinusoidal current in phase with the input voltage to achieve high power factor. The circuit provides a simplified configuration over prior power converters that may be used with a resonant load as part of an electronic ballast or an AC-to-DC converter. The power converter configuration and operation also achieves a low total harmonic distortion on the input line power.

24 Claims, 6 Drawing Sheets

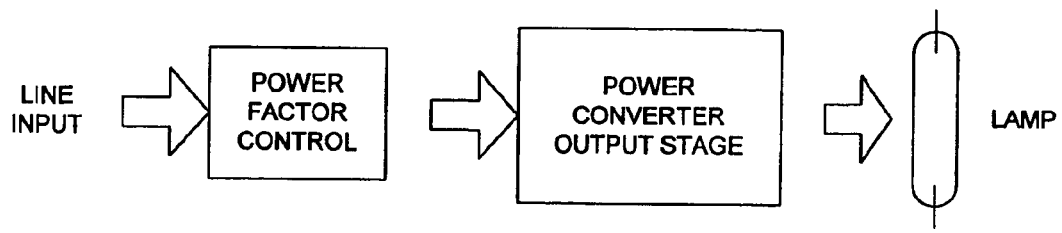
Prior Art Fig. 1
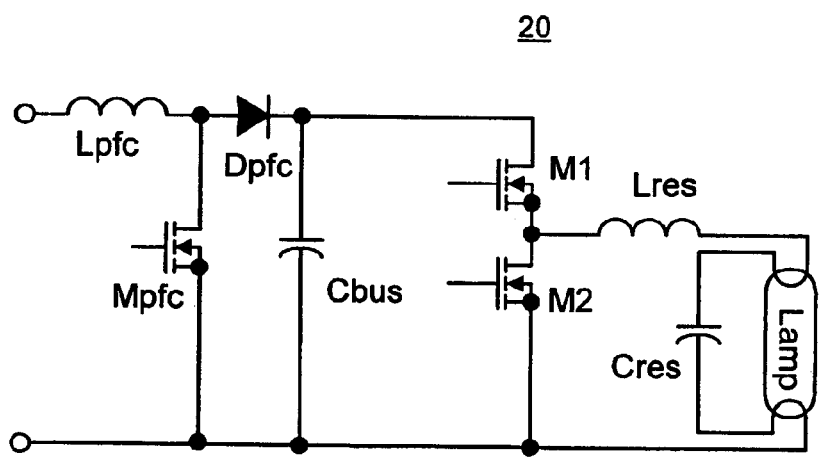
Prior Art Fig. 2

SINGLE STAGE PFC AND POWER CONVERTER UNIT

CROSS-REFERENCE TO RELATED APPLICATION

The present application is based on and claims benefit of U.S. Provisional Application No. 60/450,572 filed Feb. 27, 2003, entitled NEW SINGLE-STAGE PFC AND BALLAST CONTROL CIRCUIT/GENERAL PURPOSE CONVERTER, to which a claim of priority is hereby made and which is hereby incorporated by reference into the present application in its entirety.

BACKGROUND OF THE INVENTION

1. Field of the Invention

The present invention relates generally to power converters and ballast controls with power factor correction (PFC), and relates more specifically to a single-stage power converter or ballast control that incorporates a PFC circuit.

2. Description of Related Art

Electronic ballasts and power converters that include a power factor correction (PFC) circuit are well known in the relevant industries. Typically, any type of general power converter, which includes electronic ballasts, have connected to their input a PFC circuit to preferably correct the input power factor to unity. It is desirable, and often required according to regulatory demands, that loads connected to power lines appear as purely resistive loads without any connective impedances. That is, the alternating voltage and current supplied by the line input are maintained to be in phase with each other so that the connected load appears purely resistive. When the input voltage and current are in phase, the power factor approaches unity, thereby providing a load that appears to be purely resistive on the input line, without any apparent influence from capacitance or inductance that would otherwise occur if the voltage and current are out of phase with each other.

To achieve a unity power factor, a power factor correction circuit is typically connected to the power line input. The PFC circuit also generally produces a regulated DC bus voltage that is supplied to an inverter for use in power conversion applications. A typical power converter application is an electronic ballast for use with a fluorescent lamp. Often, an electronic ballast consists of a power inverter fed by a DC bus voltage, with the inverter being controlled to provide fluorescent lamp pre-heating, ignition and normal supply power during normal running conditions. A simple block diagram of such an application is provided in FIG. 1. The electronic ballast illustrated in FIG. 1 includes a half-bridge resonant output stage for powering the lamp. The PFC circuit connected to the power line input is typically realized as a boost-type converter that uses a high voltage switch, an inductor, a diode, a high voltage DC bus capacitor and a PFC control circuit. The electronic ballast output stage is typically realized with a half-bridge driven resonant load that uses two high voltage switches, a resonant inductor, a resonant capacitor, a DC-blocking capacitor and a ballast control circuit. A simplified circuit diagram of a conventional electronic ballast circuit is shown in FIG. 2.

The conventional half-bridge electronic ballast output stage configuration shown in FIG. 2 includes a DC bus capacitor Cbus that is connected across the switching half-bridge. As can be seen in the circuit diagram in FIG. 2, high side half-bridge switch M1 and DC bus capacitor Cbus are connected together at a single node. When the conventional electronic ballast of FIG. 2 is switched on, input power is first used to charge DC bus capacitor Cbus, which then supplies power to the half-bridge resonant output stage while the electronic ballast operates. The PFC circuit composed of inductor Lpfc, switch Mpfc and diode Dpfc operate during start-up to charge bus capacitor Cbus. In this conventional circuit typology, power typically flows in a single direction through the load, and bus capacitor Cbus supplies power through the entire cycle of power transfer to the load. Accordingly, bus capacitor Cbus must be rated to withstand peak power transfer, and switches Mpfc, M1 and M2 must also be rated to withstand high peak bus voltages.

It would be desirable to reduce the ratings needed to realize a power converter circuit with an input PFC circuit, and simplify the circuit at the same time.

SUMMARY OF THE INVENTION

The present invention provides a single stage PFC and power converter for general purpose power supply for resonant loads. By modifying the circuit topology of the conventional half-bridge power converter, the present invention achieves efficiencies and reduced part counts that are improved over the conventional design. The inventive circuit configuration also reduces the requirements for component ratings so that circuit size and power consumption are reduced. The single stage power converter and PFC circuit has the potential to obtain soft switching in all switches, thereby reducing switching losses and further reducing power consumption.

In accordance with the present invention, the conventional boost converter for power factor correction is eliminated because the function is combined into the operation of supplying constant power to the load. The circuit obtains a power factor that is close to unity while providing bi-directional power flow control. A switching half-bridge is connected to the rectified line input voltage, which permits the conventional input inductor to be omitted, while reducing the rating requirements for a DC bus capacitor. By appropriately controlling the switches in the power converter, a sinusoidal current is drawn from the line input to obtain a high power factor. In the conventional power converter, the capacitor in the boost converter was operated to maintain constant voltage over varying load and input conditions, and was thus very large. In the present invention, the boost converter is eliminated and the bus capacitor need not maintain a constant voltage, but rather serves as an energy storage device for transferring power between the input and the load. Accordingly, the bus capacitor can be reduced by a factor of up to 2–4 times.

Conduction angles for the various switches are derived to achieve constant load power while maintaining a high power factor. In addition, total harmonic distortion of the input is greatly reduced, thereby limiting radiated and conducted electromagnetic interference (EMI).

Other features and advantages of the present invention will become apparent from the following description of the invention which refers to the accompanying drawings.

BRIEF DESCRIPTION OF THE DRAWING

The present invention is described in greater detail below with reference to the accompanying drawings, in which:

FIG. 1 is a block diagram of a prior art power converter with separate PFC and output stages;

FIG. 2 is a simplified circuit diagram of a conventional power converter for driving a fluorescent lamp.

DETAILED DESCRIPTION OF THE PREFERRED EMBODIMENT

Figure 3:
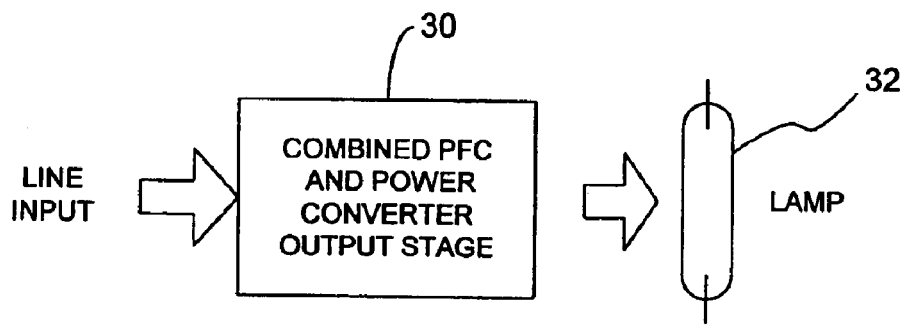
FIG. 3 is a block diagram of a power converter according to the present invention with combined PFC and output stages.

Referring now to FIG. 3, a block diagram of the single stage power converter with power factor correction (PFC) is illustrated as block 30. The single stage power converter is illustrated as driving a load, such as a resonant load for an electronic lamp ballast that powers a fluorescent lamp 32.

Figure 4:
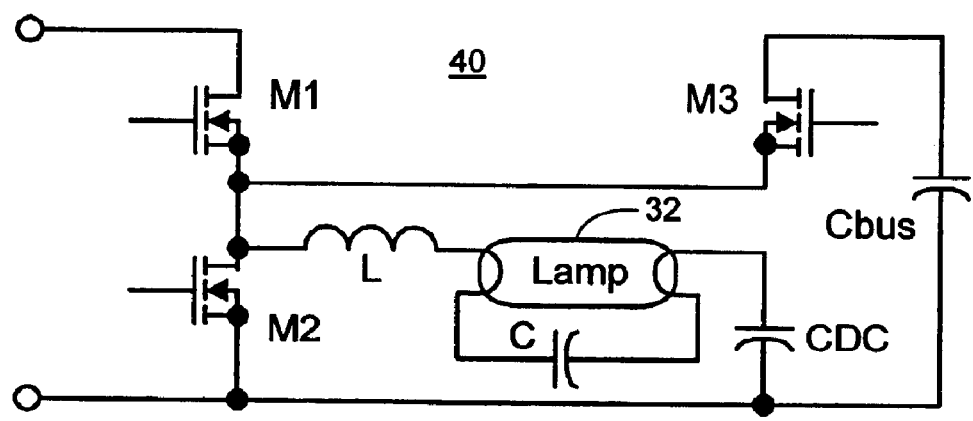
FIG. 4 is a simplified circuit diagram showing a circuit topology according to the present invention for driving a fluorescent lamp.

Referring now to FIG. 4, the circuit diagram of the single stage power converter according to the present invention is illustrated generally as circuit 40. Circuit 40 includes a switching half-bridge composed of switches M1 and M2, which is connected to a simple RCL ballast resonant output stage composed of inductor L, capacitor C, DC capacitor CDC and lamp 32. Switches M1 and M2 are operated in complementary fashion, that is, both switches are not on at the same time. In addition, when switches M1 and M2 are turned on and off in sequence, a dead time is introduced in between the switching sequence to avoid short circuit conditions. An exemplary dead time is approximately two microseconds. A switch M3 connects a DC bus capacitor CBUS to the central node of the switching half-bridge. Circuit 40 differs from conventional electronic ballast circuit 20 shown in FIG. 2 by employing a single inductor L and reducing the capacitance requirements for capacitor CBUS. By reducing the rating requirements for capacitor CBUS, a non-electrolytic type capacitor may be used in the circuit to reduce cost and improve reliability of the electronic ballast.

The resonant network may also be replaced by a piezoelectric transformer equivalent, and the lamp may also be replaced by a transformer coupled resistive load in the case of an AC to DC converter. Accordingly, the circuit of the present invention is also suitable for use as a general purpose converter with power factor correction and reduced cost and component count.

Electronic ballast circuit 40 obtains bi-directional power flow through the load when connected as illustrated. The load receives power from the rectified line input, for example, when the rectified line input voltage is high, through the switching half-bridge, and is also supplied power from the bus capacitor CBUS when the rectified line input voltage is low. In this configuration, capacitor CBUS supplies power for a portion of the input line voltage cycle, rather than over the entire input cycle, as is the case in conventional circuit 20 in FIG. 2. Switches M1, M2 and M3 are controlled to draw a sinusoidal current from the line input to obtain a high power factor. The circuit configuration obtains an advantageous total harmonic distortion (THD) on the input as well. The half-bridge obtains this advantage for the input without resorting to a boost circuit that would otherwise be carefully controlled to reduce THD to acceptable levels. In addition, control of switches M1, M2 and M3 maintains a charge on bus capacitor CBUS, and provides constant power to the load. In this configuration, the resonant output stage consists of inductor L, capacitor C, lamp 32 and DC bus capacitor CBUS.

The topology of circuit 40 is configured to operate so that each switch has a particular function. For example, switch M1 supplies current to the resonant lamp load from the rectified line input, and is switched on and off to draw sinusoidal current from the line input to achieve a high power factor. Switch M2 is switched on and off to obtain a recirculation path in circuit 40 to maintain bi-directional current flow in the resonant circuit. Switch M3 operates to charge DC bus capacitor CBUS when the line input voltage is high, and supplies current to the load when the line input voltage is low, to maintain constant power supplied to the load. It is possible to configure the operation of switches M1–M3 so that soft switching occurs in each switch. Switch turn on/turn off operation is configured according to a particular curve in this instance to avoid hard, or non-zero voltage switching for each of the switches.

Figure 5:
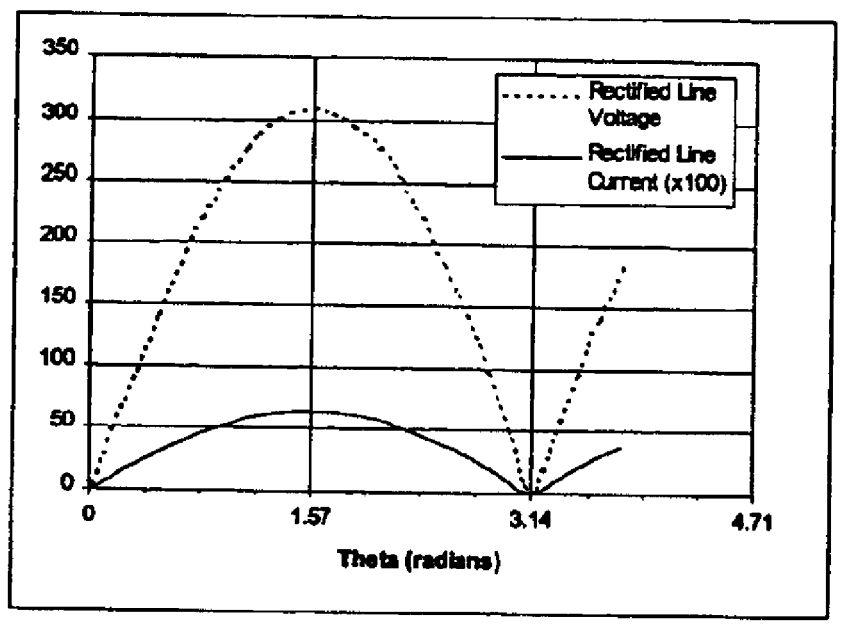
FIG. 5 is a graph illustrating rectified line input voltage and current.

Circuit 40 obtains a high power factor that approaches unity because the input line voltage and current are controlled to be sinusoidal and in phase with each other. With this high power factor, circuit 40 appears as a resistive load to the line input voltage, thereby reducing impedances on the line input and meeting requirements under regulatory standards. Referring now to FIG. 5, the rectified line input is presumed to be the output of a full bridge rectifier to achieve full wave rectification. FIG. 5 illustrates the full wave rectified voltage and current being in phase with each other, as is typically the case in a standard or close to ideal full wave rectifier. In this instance, the input power is determined by multiplying the input voltage and current together. Equation 1 gives the expression of the input power.

$$P_{input} = P_{load}(1 - \cos 2\Theta) \quad (1)$$

If the goal of the converter is to supply constant power to the load, the power supplied by bus capacitor CBUS is determined by subtracting the load power from the input power and is expressed in equations 2 and 3.

$$P_{capacitor} = P_{load} - P_{input} \quad (2)$$

$$P_{capacitor} = P_{load} - P_{load}(1 - \cos 2\Theta) = P_{load} \cos 2\Theta \quad (3)$$

Figure 6:
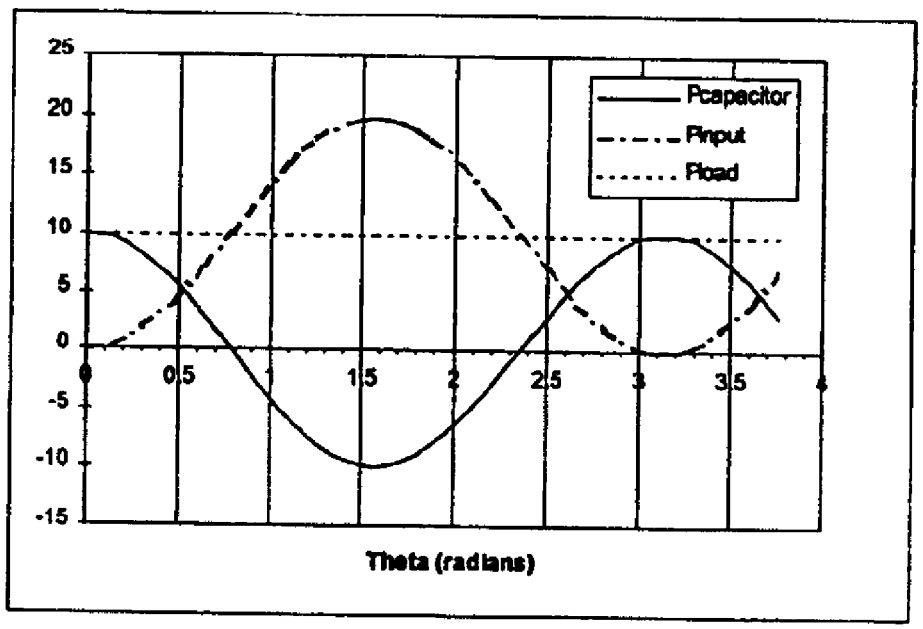
FIG. 6 is a graph illustrating input power, load power and capacitor power.

Referring now to FIG. 6, a graph illustrating input power, load power and capacitor power over a complete cycle of the line input voltage is provided. Note how the capacitor power changes with the input power to maintain a constant load power.

To achieve the design goal of constant load power, the conduction angles of switches M1 and M3 are determined. Conduction angle α for switch M1 and β for switch M3 are solved with respect to a complete load current cycle, which tends to be at a much higher frequency than the line input frequency. Conduction angle α is determined using the relationship between the instantaneous line input current and the average high frequency load current and is expressed below in equations 4–6.

$$\alpha = \alpha_1 \text{ when } \beta < 0, \text{ or, } \alpha = \alpha_2 \text{ when } \beta \geq 0 \quad (4)$$

$$\alpha_1 = \frac{360}{2\pi} \left\{ \arccos\left( \frac{-2 \cdot \pi \cdot P_{in}}{V_{in} \cdot i_{load}} + 1 \right) \right\} \quad (5)$$

$$\alpha_2 = \frac{360}{2\pi} \left\{ \arccos\left( -2 \cdot \pi \cdot \left| \frac{P_{in}}{V_{in} \cdot i_{load}} \right| + \cos\left( \beta \cdot \left( \frac{2 \cdot \pi}{360} \right) \right) \right) \right\} \quad (6)$$

Conduction angle β is determined using the relationship between the capacitor power and the average high frequency load current and is expressed below in equation 7.

$$\beta = \frac{360}{2\pi} \left\{ \arccos\left( -2 \cdot \pi \cdot \left| \frac{P_{Cbus}}{V_{Cbus} \cdot i_{load}} \right| + 1 \right) \right\} \cdot \text{sign}\left( \frac{P_{Cbus}}{V_{Cbus} \cdot i_{load}} \right) \quad (7)$$

Figure 7:
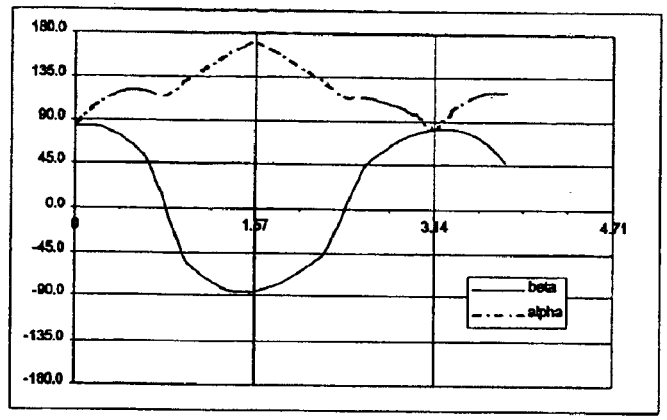
FIG. 7 is a graph illustrating conduction angles for switches in the power converter according to the present invention.

Referring now to FIG. 7, a graphical representation of conduction angles α and β is presented. The graph in FIG. 7 illustrates how conduction angles α and β change dynamically over a complete cycle of the line input voltage for a typical line input voltage, load power, capacitor voltage and capacitor value.

Figure 8:
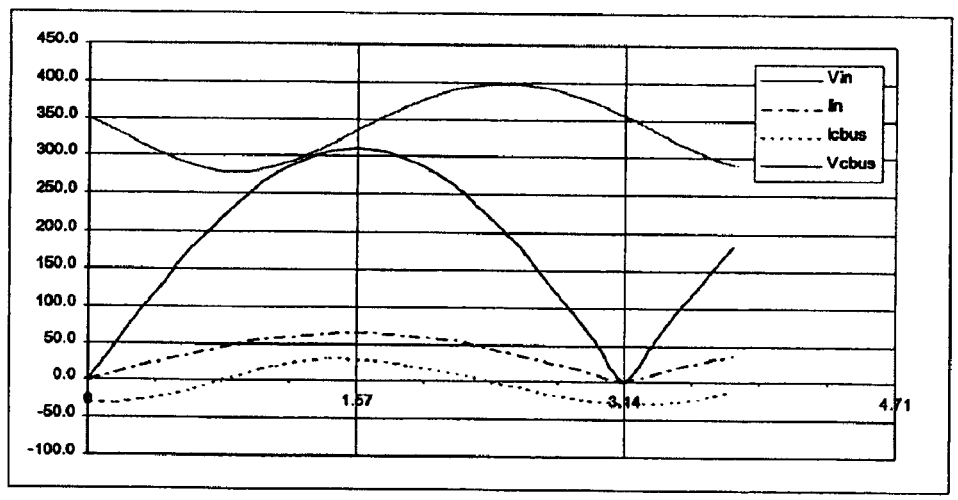
FIG. 8 is a graph illustrating input current and voltage and bus capacitor voltage and current.

Referring now to FIG. 8, a plot of input voltage and current is illustrated superimposed upon plots of current and voltage for bus capacitor CBUS. The illustrated voltages and currents are provided for a typical input voltage and load power.

Conduction angles α and β are used to turn on and off switches M1, M2 and M3 for particular times and durations during each high frequency load current cycle, based on values for α and β during each low frequency cycle of the input line voltage. The conduction angle for each switch is summarized in Table I below.

TABLE I

| Switch | β ≥ 0 | β < 0 |
|--------|-------|-------|
| M1 | From β to α₂ | From 0 to α₁ |
| M2 | From 180 to β | From α₁ to 180 |
| M3 | From α₂ to 180 | From 180 to 360 |

The conduction angles and switch operation are describe in greater detail with reference to FIGS. 9–11 below.

Figure 9:
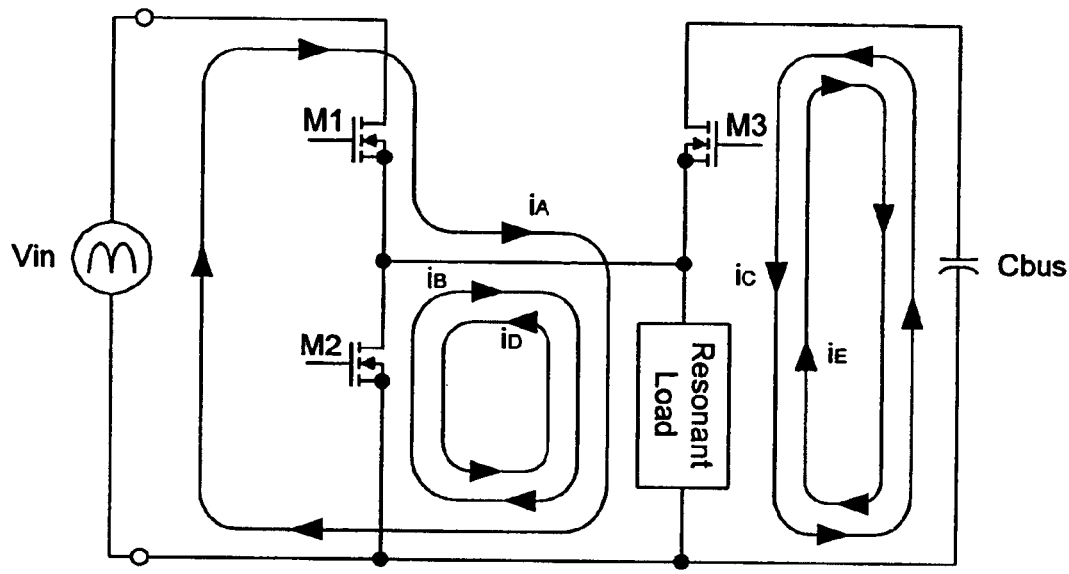
FIG. 9 is a simplified circuit diagram illustrating bi-directional power flow according to the present invention.
Figure 10:
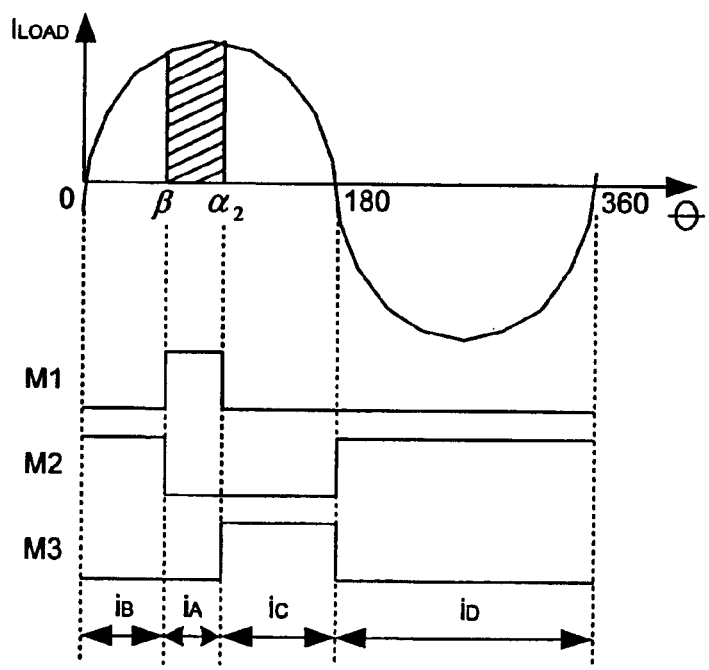
FIG. 10 is a graph and timing diagram illustrating conduction angle switching in the circuit according to the present invention.

Referring now to FIG. 9, a current loop diagram is illustrated showing current pathways and loops during different switching and conduction cycles. Referring to FIGS. 10 and 11, the occurrence and duration of each of the current paths or loops is described with reference to current load and switching cycles. For example, FIG. 10 shows a corresponding on and off times for switches M1, M2 and M3 during one period of a typical resonant load current when β≥0. Switch M1 is turned on during the angle from β to α₂ degrees. Current iA illustrated in FIG. 9 flows from Vin through switch M1, through the resonant load, and back to the return ground to Vin. Switch M1 is then turned off and switch M3 is turned on during the angle from α₂ to 180 degrees. Current iC flows from capacitor CBUS through switch M3, through the resonant load and back to the return ground to capacitor CBUS. Switch M3 is turned off and switch M2 is turned on from 180 to 360 degrees. Current iD flows from the resonant load, through switch M2 and back to the return ground to the resonant load. Switch M2 remains on from 0 to β and current iB flows from the return ground of the resonant load, through switch M2 and back to the resonant load. The cycle then repeats itself with switch M1 being turned on again.

Figure 11:
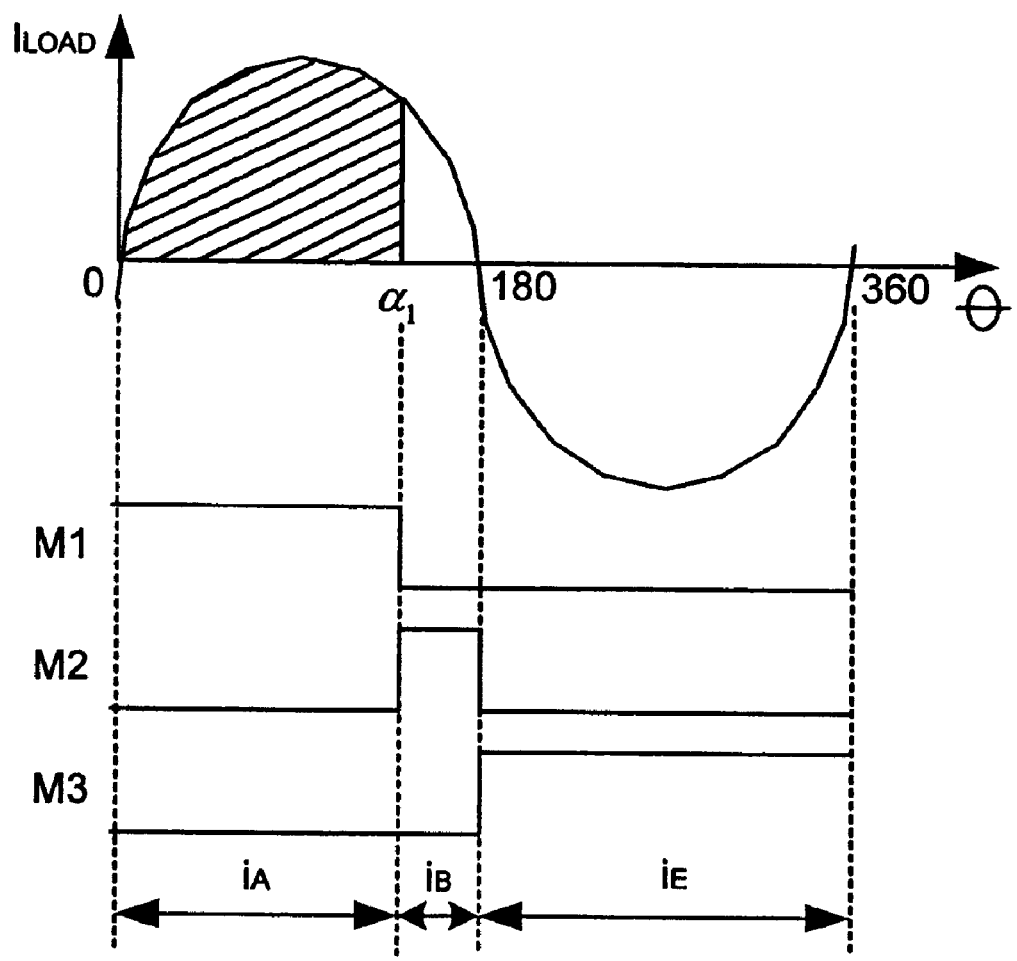
FIG. 11 is a graph and timing diagram showing conduction angle switching according to the power converter of the present invention.

FIG. 11 illustrates the corresponding on and off times of switches M1, M2 and M3 during one period of a typical resonant load current when β<0. Switch M1 turns on during the angle from 0 to α₁ degrees. Current iA flows from Vin through switch M1, through the resonant load and back to the return ground to voltage Vin. Switch M1 is then turned off and switch M2 is turned on during the angle from α₁ to 180 degrees. Current iB flows from the return ground of the resonant load, through the body diode of switch M2 and back to the resonant load. Switch M2 is then turned off and switch M3 is turned on from 180 degrees to 360 degrees. Current iE flows from the resonant load, through switch M3, through capacitor CBUS and returns to ground at the resonant load. The cycle then repeats itself with switch M1 being turned on again.

As conduction angles α and β change during the low frequency cycle of the line input voltage, i.e., as shown in FIG. 7, the conduction angles of the switches are controlled so that the average line input current is sinusoidal and in phase with the input voltage. This control scheme achieves a high power factor with a low total harmonic distortion while maintaining a constant load power. Under steady operating conditions, high frequency current flows through the resonant load at a constant amplitude by drawing load current from the line and charging bus capacitor CBUS when the input line voltage is high, drawing load current from the capacitor when the line input voltage is low, or recirculating load current when necessary.

The single stage ballast control and PFC circuit according to the present invention provides a number of advantages including the use of a single inductor and lower DC bus capacitance grading requirements. The circuit obtains a high power factor in a more efficient organization with low input current total harmonic distortion and reduced component count, size and cost for the electronic ballast/power converter.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power converter for supplying power to a resonant load, comprising:
   a single stage resonant energy transfer and PFC circuit for delivering power to the load while maintaining a high power factor;
   an energy storage device selectively coupled to an input of the power converter and the load for selectively storing input energy and supplying energy to the load; and
   the resonant energy transfer and PFC circuit being operable to draw a sinusoidal input current substantially in phase with an input voltage to obtain the high power factor.

2. The power converter of claim 1, wherein the energy storage device is a capacitor.

3. The power converter according to claim 1, wherein the sesonant load comprises a fluorescent lamp.

4. The power converter according to claim 1, further comprising a single inductor.

5. The power converter according to claim 4, wherein the inductor is coupled between the switching half-bridge and the load.

6. The power converter according to claim 1, wherein the single stage resonant power converter and PFC circuit is composed of three switches.

7. The power converter according to claim 6, wherein the switches are operable to supply constant power to the load.

8. The electronic ballast according to claim 6, wherein the switches are MOSFETs.

9. The power converter of claim 6, wherein two of the switches are arranged in a switching half-bridge across an input to the power converter.

10. The power converter according to claim 9, further comprising a switch connected between the switching half-bridge and the energy storage device.

11. A power converter circuit for use with a rectified line input, comprising:
   a switching half-bridge coupled to the rectified line input for drawing a sinusoidal current from the rectified line input in phase with an input voltage;
   a shunt switch coupled to the half-bridge for shunting current to or from the switching half-bridge; and
   an energy storage device coupled to the shunt switch for storing or releasing energy related to current shunted by the shunt switch.

12. The power converter according to claim 11, wherein the energy storage device is a capacitor.

13. The power converter according to claim 11, wherein the switches are MOSFETs.

14. The power converter according to claim 11, further comprising a resonant output stage coupled to the switching half-bridge.

15. The power converter according to claim 14, wherein the resonant output stage further comprises a lamp.

16. The power converter according to claim 11, further comprising a piezoelectric transformer coupled to the switching half-bridge.

17. The power converter according to claim 16, further comprising a resistive load coupled to the piezoelectric transformer, thereby forming an AC-to-DC converter.

18. The power converter according to claim 11, wherein the half-bridge and shunt switches are operable to achieve constant load power.

19. The power converter according to claim 18, wherein the half-bridge and shunt switches are operable to achieve constant load power in accordance with the following equations:

| Switch | $\beta \geq 0$ | $\beta < 0$ |
|---|---|---|
| M1 | From $\beta$ to $\alpha_2$ | From 0 to $\alpha_1$ |
| M2 | From 180 to $\beta$ | From $\alpha_1$ to 180 |
| M3 | From $\alpha_2$ to 180 | From 180 to 360 | where $$\alpha = \alpha_1 \text{ when } \beta < 0, \text{ or, } \alpha = \alpha_2 \text{ when } \beta \geq 0 \quad (4)$$

$$\alpha_1 = \frac{360}{2\pi}\left\{\arccos\left(\frac{-2 \cdot \pi \cdot P_{in}}{V_{in} \cdot i_{load}} + 1\right)\right\} \quad (5)$$

$$\alpha_2 = \frac{360}{2\pi}\left\{\arccos\left(-2 \cdot \pi \cdot \left|\frac{P_{in}}{V_{in} \cdot i_{load}}\right| + \cos\left(\beta \cdot \left(\frac{2 \cdot \pi}{360}\right)\right)\right)\right\} \quad (6)$$

$$\beta = \frac{360}{2\pi}\left\{\arccos\left(-2 \cdot \pi \cdot \left|\frac{P_{Cbus}}{V_{Cbus} \cdot i_{load}}\right| + 1\right)\right\} \cdot \text{sign}\left(\frac{P_{Cbus}}{V_{Cbus} \cdot i_{load}}\right) \quad (7)$$

where

M1 and M2 represent high and low half-bridge switches, respectively;

M3 represents the shunt switch;

$\alpha$, $\alpha_1$, $\alpha_2$ and $\beta$ represent conduction angles during which periods of time the relevant switches are on;

Pin represents input power;

Vin represents input voltage;

iload represents load current;

Pcbus represents energy storage device power; and

Vcbus represents energy storage device voltage.

20. A method for operating a power converter circuit composed of a switching half-bridge coupled to a power converter input and a shunt switch coupled to the half-bridge and an energy storage device, comprising:
   switching the half-bridge and shunt switches to achieve constant power delivered to a load; and
   switching the half-bridge and shunt switches to draw sinusoidal current from the power converter input in phase with an input voltage to thereby achieve a high power factor.

21. The method according to claim 20, further comprising operating the half-bridge and shunt switches according to the following equations:

| Switch | $\beta \geq 0$ | $\beta < 0$ |
|---|---|---|
| M1 | From $\beta$ to $\alpha_2$ | From 0 to $\alpha_1$ |
| M2 | From 180 to $\beta$ | From $\alpha_1$ to 180 |
| M3 | From $\alpha_2$ to 180 | From 180 to 360 | where $$\alpha = \alpha_1 \text{ when } \beta < 0, \text{ or, } \alpha = \alpha_2 \text{ when } \beta \geq 0 \quad (4)$$

$$\alpha_1 = \frac{360}{2\pi}\left\{\arccos\left(\frac{-2 \cdot \pi \cdot P_{in}}{V_{in} \cdot i_{load}} + 1\right)\right\} \quad (5)$$

$$\alpha_2 = \frac{360}{2\pi}\left\{\arccos\left(-2 \cdot \pi \cdot \left|\frac{P_{in}}{V_{in} \cdot i_{load}}\right| + \cos\left(\beta \cdot \left(\frac{2 \cdot \pi}{360}\right)\right)\right)\right\} \quad (6)$$

$$\beta = \frac{360}{2\pi}\left\{\arccos\left(-2 \cdot \pi \cdot \left|\frac{P_{Cbus}}{V_{Cbus} \cdot i_{load}}\right| + 1\right)\right\} \cdot \text{sign}\left(\frac{P_{Cbus}}{V_{Cbus} \cdot i_{load}}\right) \quad (7)$$

where

M1 and M2 represent high and low half-bridge switches, respectively;

M3 represents the shunt switch;

$\alpha$, $\alpha_1$, $\alpha_2$ and $\beta$ represent conduction angles during which periods of time the relevant switches are on;

Pin represents input power;

Vin represents input voltage;

iload represents load current;

Pcbus represents energy storage device power; and

Vcbus represents energy storage device voltage.

22. The method according to claim 20, further comprising switching a switch in the half-bridge to supply current to the load and draw a sinusoidal current from the input to achieve high power factor.

23. The method according to claim 20, further comprising switching a switch in the half-bridge to obtain a recirculation path for load current.

24. The method according to claim 20, further comprising switching the shunt switch to transfer energy between the energy storage device, the input and the load.

* * * * *